Patented Dec. 12, 1950

2,533,546

UNITED STATES PATENT OFFICE 2,533,546

WATER DRIVE

Frederick W. Albaugh, Richland, Wash., assignor to Union Oil Company of California, Los Angeles, Calif., a corporation of California No Drawing. Application March 8, 1948, Serial No. 13,739

11 Claims. (Cl. 166—21)

1

This invention relates to water flooding of oil fields and more particularly to a composition and process for increasing the ratio of oil to water recovered in such operations.

It has been the practice, in recovering oil from producing wells that are approaching depletiion, to force water through the oil-bearing formation from an input well centrally located with respect to several producing wells, for the purpose of driving the oil into the latter. These oil-bearing formations may be considered to consist of pores or channels of widely different textures or degrees of permeability. During flooding operations, water is forced into above mentioned oil-bearing formation under sufficient pressure so as to wash or drive the oil remaining in the said formation through the above mentioned channels or interstices and into the producing well or wells.

The above mentioned method has proved itself of somewhat limited value in many instances, because of the fact that the flood water forcing oil from the most highly permeable channels, is itself forced into the producing well or wells, and continues to flow at ever increasing rates through the partially oil-free high permeable channels. The above condition occurs because the flood water is flowing through the larger permeable channels and also because the viscosity of water is considerably lower than that of most oils. The above mentioned excess flow of flood water results in a higher water to oil ratio at the production well or wells. These high water to oil ratios at times become so great that it is economically unsound to continue said operation which necessitates the abandonment of said producing well or wells long before all of the available oil has been recovered from the surrounding oil-bearing formation.

There are a number of methods practiced in the art which attempt to prevent this excess water flow. Some of these methods consist primarily of determining the permeability of the different strata within the well penetrated formation and then selectively and progressively sealing or plugging the zone or strata of higher permeability. The water flooding is then continued which drives the oil from the successive strata in the order of their reduced permeabilities, and successively sealing off the strata after the oil has been partially exhausted therefrom. One disadvantage in this method is that the plugging of a whole zone or strata often seals off a great deal of oil from the well, since the plugging is selective as to zones, but is not selective as to channels within said zones. Accordingly, many of the oil-containing channels within the zone, are permanently sealed off.

Another general method of water drive involves the use of water or oil field brine mixed with small amounts of certain wetting agents in order to desorb the oil from the oil-bearing formation and facilitate the transport of this oil to the output well. The principal shortcomings of the present emulsifiers include (1) prohibitive cost, (2) reaction with and precipitation by the various inorganic ions present in the connate water and oil field brine, (3) the inability of the emulsifiers to provide sufficient film strength at the oil-water interface to prevent the break-through of columns of water into the oil-rich zone and final channelling of the water through these columns to the output well, and (4) the decomposition of the added agent during the relatively long periods required to complete the water drive, for example, 6 to 18 months.

A primary object of this invention is to provide a water drive fluid which has a high film strength and resists the channelling action of the water.

Another object of this invention is to provide a water drive fluid which is not precipitated by and does not react with the components of oil field brine and connate water.

Another object of this invention is to provide a water drive process which uses a water drive fluid comprising oil field brine and a glycoside, wherein the new water drive fluid improves the efficiency of the process.

Another object of this invetnion is to provide a new water drive process wherein a naturally occurring mixture of glycoside is added to the water in order to increase the produtcion of oil per barrel of water employed in the water drive.

This invention relates to a new composition of water drive fluid and to the method of its use. The invention is based upon the addition of certain specific types of chemical agents such as glycosides to minimize the break-through of water during a water drive.

The process comprises the steps of adding a small amount of a saponin or other glycoside-containing material to water or oil field brine, pumping the fluid into an input well centrally located within the field of operation and recovering, driving the oil ahead of the advancing water drive front, removing the oil and water drive fluid from one or more output wells, separating the water drive fluid from the oil and recycling said recovered water drive fluid to the input well.

The constitution of the naturally occurring glycosides is described in the "Chemistry of Organic Medicinal Products" by Jenkins and Hartung, second edition, on pages 182 et seq. Glycosides upon hydrolysis yield one or more sugars and a non-sugar component which is called an aglycone. The majority of the naturally occurring glycosides are derivatives of the sugar, glucose, which derivatives are called glucosides. The non-sugar component of a glucoside is known as an aglucone. The glycosides are widely distributed in many plants and are found in the fruit, bark, roots and to a lesser extent in the leaves of the plant. Often two or more glycosides occur in the same plant.

Glucose and other sugars form naturally occurring addition compounds with themselves or with other sugars. The term glucoside is sometimes used to denote these disaccharides and polysaccharides. Sugar containing derivatives of this type include sucrose, maltose, lactose, cellobiase, starch and cellulose. Each of these compounds yield only sugars upon complete hydrolysis and therefore do not contain an aglycone, or an aglucone in the case of glucose derivatives.

Only those glycosides which yield an aglycone upon hydrolysis are useful in the application of this invention. Similarly only those glucosides which yield an aglucone upon hydrolysis are effective in increasing the efficiency of a water drive process. It is therefore understood that whenever the terms glycoside and glucoside are used throughout this disclosure, it is intended to denote those glycosides and glucosides which yield aglycones and aglucones upon complete hydrolysis.

Saponins constitute a special class of glycosides possessing the property of lowering the surface tension of the water and producing a permanent foam on shaking. The shaking of oil and water in the presence of a saponin produces an emulsion. The principal constituents of saponins are glucosides although derivatives of other sugars such as arabinose and galactose have been isolated.

The saponins themselves are divided into two main groups based on the type of aglycone or sapogenin present in the substance. Thus those saponins, whose aglycones or sapogenins, are derivatives of cyclopentanoperhydrophenanthrene, are called steroid saponins. Those saponins, whose aglycone is a derivative of a pentacyclic triterpene of the so called beta-amyrin group and carry a carboxyl group, comprise the second group. The surface activity steroid saponins are least affected by changes in hydrogen ion activity while the triterpene saponins are weak acids and are measurably affected by these changes.

Commercial saponin is usually obtained from the plant *Quillaja saponaria* (soap bark) or from the plant *Saponaria officinalis* (soap wort). A small supply is also obtained from the plant Sapindus saponaria (soap tree). The saponin from each of these sources is probably a mixture of two or more glycosides.

In addition to these sources saponins are widely distributed throughout the general class of plants known as Saponaria. The saponins are obtained from the bark, roots, or leaves of these plants by extraction with alcohol, water or other solvent. The saponins are glycosides and are accordingly subject to hydrolysis by the action of dilute acids and/or enzymes. The enzymes which is specific for the hydrolysis of a given glycoside is generally present in the plants containing that glycoside. In order to minimize the hydrolysis of the glycoside during its extraction from the plant, it is desirable to destroy the enzyme by the action of heat and/or chemicals prior to extraction.

In the preparation of a water drive fluid, a saponin, or a mixture of saponins, derived from such plants as *Quillaja saponaria, Saponaria officinalis, Sapindus saponaria* and the like is mixed with fresh water, sea water or oil field brine in an amount to form a mixture containing approximately 0.001 to 0.5% by weight of the saponins. The preparation of the water drive fluid may often be facilitated by dissolving the saponin in a small amount of solvent such as water, 80% by volume ethyl alcohol, and the like in order to form a concentrated solution of the saponin, which can then be blended with water to form the finished water drive fluid. The presence of a small amount of alcohol in the water drive fluid is not harmful.

Most saponins and other glycosides are expensive when pure. The extract prepared by treating a saponin-containing plant with a suitable solvent such as water or alcohol to remove the saponin may be used directly in the preparation of the water drive fluid. The characteristic enzyme for the hydrolysis of the saponin should be destroyed by heat but the evaporation of the solvent and subsequent purification by recrystallization are unnecessary for the purposes of this invention. A water drive fluid is prepared from the extract by dilution with water to form a mixture containing about 0.001 to 0.5% by weight of saponins.

Certain of the saponins and other glycosides are subject to fermentation either before or after hydrolysis. It is within the scope of this invention to destroy those agents which promote the fermentation of the saponin or other glycoside by heat or by the addition of germicides. The choice of germicide is governed by the particular saponin being used and the organisms which attack it. The soaps of certain metals such as mercuric stearate, copper stearate and the like are useful for this purpose.

The saponins are the most active of the compounds comprising glycosides for the purposes of this invention. However, those glycosides not falling within the definition of saponins also increase the efficiency of a water drive process. Thus Barbaloin which is the specific aloin derived from the plant Barbados aloes is effective. Aloin is a mixture of non-saponin type glycosides of which the principal member is a derivative which yields arabinose and an aglycon known as aloe emodin. Other naturally occurring mixtures of glycosides of unknown composition and constitution are useful in a water drive process.

The invention may be carried out in the field as follows:

The saponin obtained from the plant *Quillaja saponaria* or the plant *Saponaria officinalis* is dissolved in a small amount of hot 80% by volume ethyl alcohol to form a concentrated solution. A flooding solution is prepared by mixing the concentrated solution with an oil field brine to form a mixture containing about 0.05% by weight of the saponin. The flooding solution is introduced into an input well located centrally in relation to surrounding production wells in a depleted oil field, and is continued during the production of oil from the output wells. After a period of time it is expected that the yield of oil and the ratio of oil to water produced at the output wells will have been increased. After the oil production has increased the use of the saponin-containing water drive fluid may be continued during the entire period of the water drive operation or it may be replaced with ordinary brine after an initial saponin-containing zone has been established near the oil-water interfacial boundary.

Any of the glycosides heretofore disclosed may also be used in the manner disclosed above for producing oil from depleted wells or to increase the production of oil from producing wells.

Having fully described and illustrated the principles of my invention, I claim the following:

1. A water flooding process comprising the step of injecting a water drive fluid from an input well into an oil-bearing formation to drive said oil toward an output well, wherein said water drive fluid contains a glycoside, said glycoside yielding an aglycone and a monosaccharide upon hydrolysis.

2. A process according to claim 1 wherein the glycoside is a glucoside.

3. A process according to claim 1 wherein the glycoside comprises a mixture of saponins.

4. A process according to claim 1 wherein the glycoside is a saponin.

5. A process according to claim 1 wherein said water drive fluid comprises 0.001% to 0.5% by weight of a saponin.

6. A process according to claim 1 wherein said water drive fluid contains a saponin derived from the plant *Quillaja saponaria*.

7. A process according to claim 1 wherein said water contains a saponin derived from the plant *saponaria officinalis*.

8. A process according to claim 1 wherein said water contains a saponin derived from the plant *Sapindus saponaria*.

9. A water flooding process comprising the steps of dispersing a glycoside in water to form a water drive fluid, said glycoside yielding an aglycone and a monosaccharide upon hydrolysis, injecting said fluid into an oil-bearing formation from an input well, removing a mixture of oil-water and said glycoside from an output well separating a mixture of water and said glycoside from said oil and returning said mixture of water and glycoside to the input well for recycle.

10. A process according to claim 9 wherein the glycoside is a glucoside.

11. A process according to claim 9 wherein the glycoside is a saponin.

FREDERICK W. ALBAUGH.

REFERENCES CITED

The following references are of record in the file of this patent:

UNITED STATES PATENTS

| Number | Name | Date |
|---|---|---|
| 2,172,265 | Waltz | Sept. 5, 1939 |
| 2,341,500 | Detling | Feb. 8, 1944 |

OTHER REFERENCES

The Merck Index, 5th edition, Merck Co., Rahway, N. Y., 1940, page 490.

The Oil Weekly, April 2, 1945, pages 40 to 48.